(12) United States Patent
Fuehrer et al.

(10) Patent No.: US 7,721,030 B2
(45) Date of Patent: May 18, 2010

(54) METHOD AND DEVICE FOR CONNECTING SENSORS OR ACTUATORS TO A BUS SYSTEM

(75) Inventors: Thomas Fuehrer, Gerlingen (DE); Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 731 days.

(21) Appl. No.: 10/930,289

(22) Filed: Aug. 31, 2004

(65) Prior Publication Data

US 2005/0066101 A1 Mar. 24, 2005

(30) Foreign Application Priority Data

Sep. 1, 2003 (DE) .................. 103 40 165

(51) Int. Cl.
*G06F 13/42* (2006.01)

(52) U.S. Cl. .................. 710/105; 710/61; 710/124; 713/501

(58) Field of Classification Search .................. 710/61, 710/69, 105, 117, 124, 300, 305; 713/500–503
See application file for complete search history.

(56) References Cited

U.S. PATENT DOCUMENTS

| | | | | |
|---|---|---|---|---|
| 5,572,529 A * | 11/1996 | Buhrgard et al. | ............ | 370/503 |
| 5,769,359 A * | 6/1998 | Rutan et al. | ................ | 244/76 R |
| 6,002,996 A * | 12/1999 | Burks et al. | ................. | 702/188 |
| 6,118,835 A * | 9/2000 | Barakat et al. | ............. | 375/372 |
| 6,842,808 B2 * | 1/2005 | Weigl et al. | ................. | 710/117 |
| 7,081,693 B2 * | 7/2006 | Hamel et al. | ................ | 307/151 |
| 7,096,295 B2 * | 8/2006 | Hartwich | .................... | 710/260 |
| 7,107,473 B2 * | 9/2006 | Fuehrer et al. | .............. | 713/400 |
| 2002/0083298 A1 * | 6/2002 | Cook et al. | .................... | 712/25 |
| 2004/0081079 A1 * | 4/2004 | Forest et al. | ................ | 370/216 |
| 2004/0193932 A1 * | 9/2004 | Fuehrer et al. | .............. | 713/400 |
| 2005/0013394 A1 * | 1/2005 | Rausch et al. | ............... | 375/356 |
| 2005/0017602 A1 * | 1/2005 | Arms et al. | ................. | 310/339 |

\* cited by examiner

*Primary Examiner*—Mark Rinehart
*Assistant Examiner*—Nimesh G Patel
(74) *Attorney, Agent, or Firm*—Kenyon & Kenyon LLP

(57) ABSTRACT

A method for connecting at least one sensor or actuator to a time-controlled bus system, the sensor or actuator carrying out a signal processing in at least two phases, the signal processing in a first phase taking place at a higher speed than in a second phase, the sensor or actuator being synchronized to a time, which is external to the sensor, of the time-controlled bus system in at least one of the phases.

12 Claims, 2 Drawing Sheets

METHOD AND DEVICE FOR CONNECTING SENSORS OR ACTUATORS TO A BUS SYSTEM

FIELD OF THE INVENTION

The present invention relates to a method and a device for connecting at least one sensor or actuator to a time-controlled bus system and a corresponding sensor or actuator.

BACKGROUND INFORMATION

Interconnection of control units, sensors, and actuators, using such a communication system, i.e., bus system, has increased and may have even drastically increased in the past few years with the construction of modern motor vehicles, in machine construction, in the machine tool industry in particular, as well as in automation and other industrial applications. Synergistic effects as a result of the distribution of functions to a plurality of control units may thus be achieved. This is referred to as a distributed system. Communication among different nodes takes place increasingly via at least one bus or at least one bus system. Communication traffic on the bus system, access and receiving mechanisms, as well as error processing are regulated via a protocol.

One approach for doing so is time-controlled communication in time-controlled bus systems. Such time-controlled communication systems are based on cyclical transmission of messages in a fixed time pattern. The sequence for this time pattern is derived from a freewheeling timer or time master in the system, which specifies this global time for the time-controlled bus system. One example of such a time-controlled bus system is the time-controlled CAN (Controller Area Network) corresponding to ISO Standard 11898-4, known as TTCAN or time-triggered controller area network.

In the TTCAN and other time-controlled bus systems, such as FlexRay, communication rounds (for example, basic cycle) are formed; such time-controlled communication systems, such as TTCAN or FlexRay, are thus essentially based on time-controlled periodic communication, which is timed by a main timing node, referred to as the time master, with the help of a time reference message or reference message for short. The period to the next reference message is referred to as the basic cycle, which is subdivided into a predefinable number of time windows and includes the cycle time of the time-controlled bus system.

Control units in such time-controlled communication systems may have direct bus access for exchanging application messages. These messages must be provided in a timely manner in the above-described time-controlled bus systems. This requirement may be met, for example, by using a time-controlled operating system, such as OSEK. The time perception of the operating system, an OSEKtime-compatible OS, for example, is then derived from the above-described global time (GT).

In such interconnected systems having time-controlled communication, sensors and actuators are also directly connected, i.e., the logic of the sensor or actuator also assumes the function of participating in the bus traffic.

The special behavior, the time behavior in particular, of the bus system when sensors and actuators are used is not specifically explained in the related art. This means that the time-controlled behavior of such bus systems is not directly assumed by the sensor or actuator, thereby resulting in time uncertainties with reference to the timeliness of the measurement data in particular in the case of sensors in addition to the maximum allowable phase rotation normally described in the sensor specification, i.e., a time shift within the signal processing.

SUMMARY OF THE INVENTION

In the framework of the exemplary embodiment and/or exemplary method of the present invention to be elucidated in the following, it is assumed that vehicle systems will be increasingly provided with regulating loops which communicate via bus systems, and therefore the time behavior, i.e., the aging of data due to the transport over the bus system, is to be taken into account.

Therefore, an object of the exemplary embodiment and/or exemplary method of the present invention is to minimize time differences with respect to the timeliness of data when sensors or actuators are connected to a time-controlled bus system.

To achieve this object, a method and a device for connecting at least one sensor or actuator to a time-controlled bus system and a corresponding sensor or actuator are assumed, the sensor or actuator processing signals in at least two phases, and the signal processing in a first phase taking place at a higher speed than in a second phase. According to the exemplary embodiment and/or exemplary method of the present invention, the time-controlled behavior of the bus system is imposed by synchronizing the sensor or actuator in at least one of the phases with a time which is external to the sensor, in particular a global time or a cycle time of the time-controlled bus system.

The first signal processing phase, which is to occur at a higher speed, and the time of the time-controlled bus system which is external to the sensor are synchronized in a first embodiment. Therefore, in a first embodiment, the first signal processing phase, which is to occur at a higher speed, is synchronized with the time of the time-controlled bus system which is external to the sensor.

The second signal processing phase and the time of the time-controlled bus system which is external to the sensor are synchronized in another embodiment.

The time which is external to the sensor is advantageously the global time or the cycle time of the time-controlled bus system. In an exemplary embodiment, a TTCAN as described in ISO 11898-4 is used as the time-controlled bus system.

Synchronization advantageously takes place according to the exemplary embodiment and/or exemplary method of the present invention by retrieving time information representing the time which is external to the sensor from register areas of a bus coupling unit. In another exemplary embodiment, the time information for synchronization is obtained by inputting via an input path, the time information also being derived from the time which is external to the sensor and transmitted onto the input path. The input path may be specified externally, i.e., via a separate pin, or via the connection to the bus coupling unit, time information being derived from a time of a bus coupling unit which is external to the sensor and transmitted onto the input path.

This enables the tuning of the processing logic of a modern sensor or actuator and the computation or processing of measurements to yield measurement data to the externally specified time conditions, including those of the time-controlled bus system, such as communication cycle and time of transmission of the measurement data. This permits time uncertainties or shifts with respect to the timeliness of the data to be reduced even under real-time conditions to a far greater extent than in the related art.

DETAILED DESCRIPTION

In the following, mainly the connection of a sensor to the time-controlled bus system is described, actuators are connectable in a similar manner with respect to the exemplary embodiment and/or exemplary method of the present invention if they exchange data via the time-controlled bus system.

Figure 1:
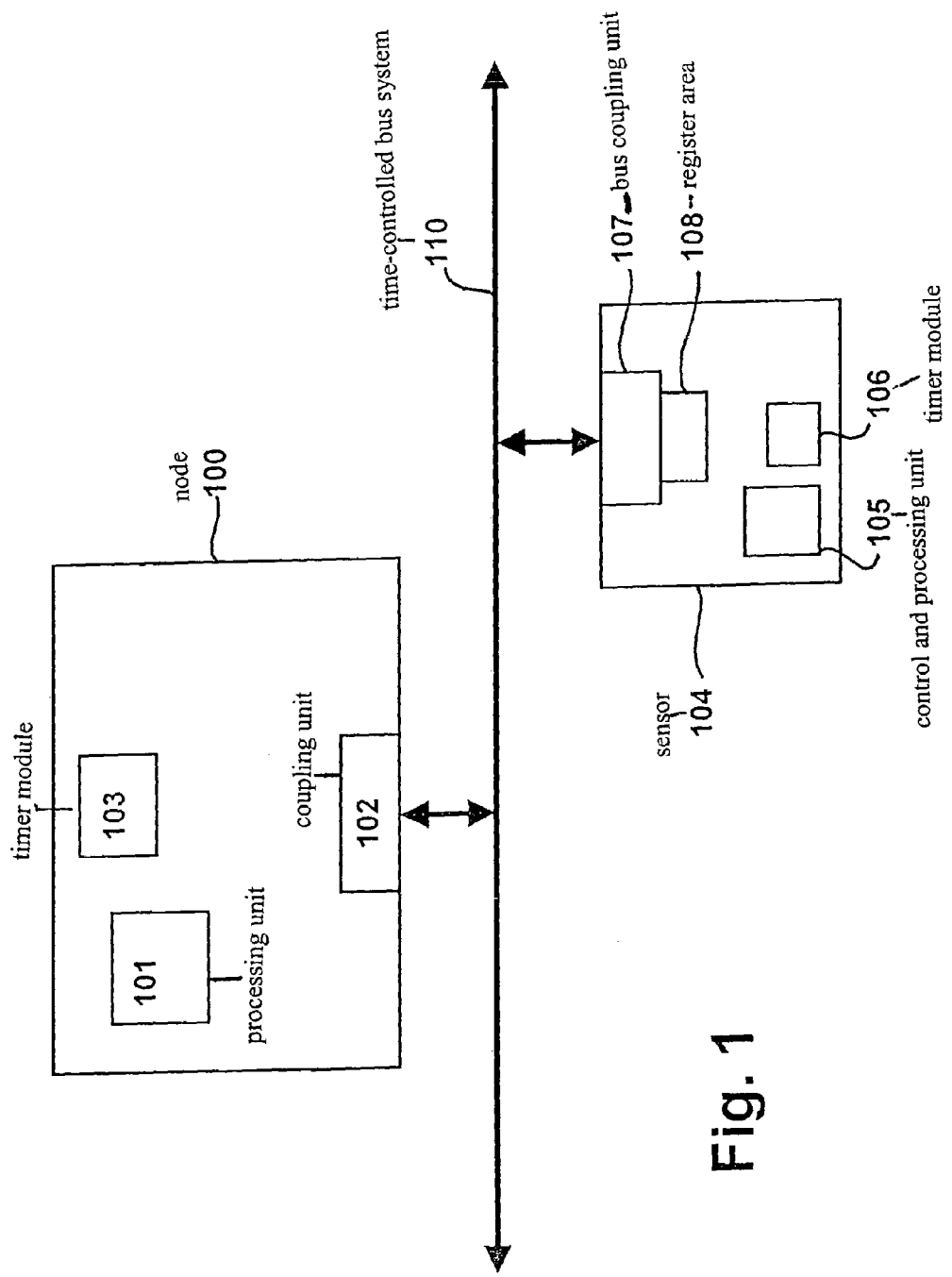
FIG. 1 shows a time-controlled bus system having at least one node and at least one sensor.

FIG. 1 shows a time-controlled bus system 110 having a node 100, a control unit in particular, which is connected to bus system 110 via a coupling unit 102. Control unit 100 contains a processing unit 101 and a timer module 103. This control unit 100 is the bus master, for example, i.e., the unit which determines the time behavior of the time-controlled bus system. This takes place, as described above, for example, by transmitting a reference message controlled by the control unit's timer module 103, which then yields the global time of the bus system. The cycle time of the bus system is obtained from the time between two reference messages.

Thus, for example, each node has its own time basis, i.e., timer such as 103, which in turn forms a counter, a cycle generator, an oscillator, etc., via its internal arrangement, such as a clock, or it may be transmitted from the outside to the particular node. Thus, each node has a local time, and only one specific node, timer or time master 400, has a special status, so that its time basis forms the basis for specifying the global time GT as the global time basis. Each node may then adjust its time perception to this global time by tuning from its local time basis and an offset with respect to the global time GT. The cycle time as the interval between two reference messages is then correlated with the global time as a function of possible time shifts of the global time basis.

According to the exemplary embodiment and/or exemplary method of the present invention, a sensor 104 is a rotational speed sensor, for example, in a vehicle. The illustrated sensor 104 also contains a bus coupling unit 107, a register area 108 which is either a standalone unit or contained in the bus coupling unit, a control and processing unit 105, and a timer module 106. In this example, the specification of a rotational speed sensor describes the phase rotation at 25 Hz with a maximum of 30°. This phase rotation is already utilized in the design of the sensor by the required output filter. This sensor is used in a modern time-controlled bus system as illustrated, having a cycle of 1 millisecond, for example. This time grid is specified by the bus system as described above. The message containing the measurement data for this sensor thus also obtains a certain position in the cycle. This also means, however, that transmission of measurement data at a later time in the current cycle may no longer be done. If the digital signal processing and the speed sensor run asynchronously in this cycle of the bus system, a time uncertainty of 1 millisecond plus the specified phase rotation results for the timeliness of the measurement data. In this example, this means an additional phase rotation of 9° at 25 Hz, i.e., about one-third of the specification. In the overall control circuit, there are usually additional communication paths, for example, to the actuator, which may result in excessive phase rotation and thus in instability of the overall regulation.

In addition to the speed sensor, the same also applies to the ESP (Electronic Stability Program), for example, and to other sensor applications, in the vehicle in particular, such as speed sensors, for wheel speeds for example, or engine speeds within the corresponding regulation, or the HFM (Hot Film Mass sensor) or the acceleration sensor used in connection with the air bag function, for example. In the above and other sensor applications, the above-described problem of phase rotation arises as well as the problem of the additional time uncertainty regarding the asynchronism between the time-controlled bus system and the connected sensor.

Figure 2:
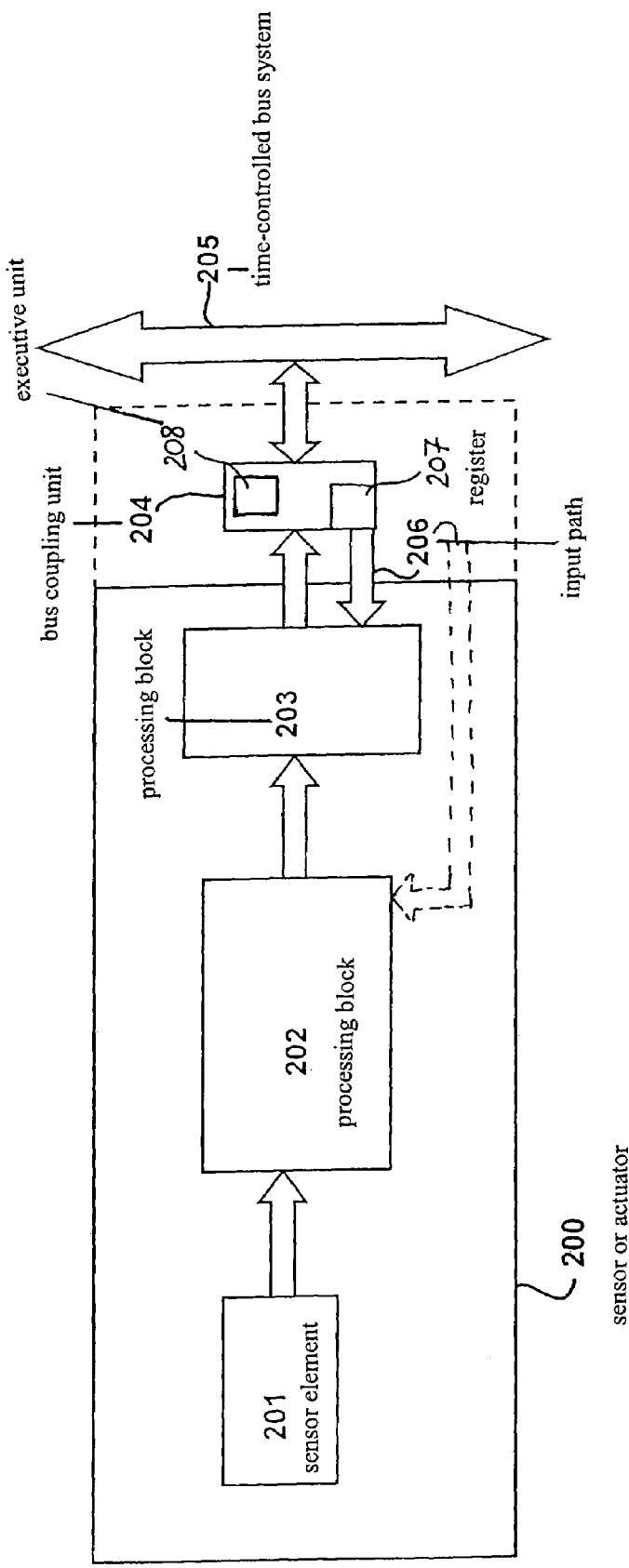
FIG. 2 shows a block diagram of the sensor together with a bus interface or bus coupling unit.

This problem is eliminated by bringing the internal digital logic of the sensor to a time which is external to the sensor, i.e., synchronizing it. This means that the internal digital logic of the sensor is brought to the global time or the cycle time of the communication system, i.e., synchronized therewith. It is thus achieved that the measurement data is processed in the sensor in such a way that the measurement data is available at the scheduled point in time in the communication cycle when the message is to be transmitted. FIG. 2 shows a block diagram of sensors in control circuits having bus systems, the same method as mentioned above regarding the device also being applicable in the case of actuators in the control circuit. In FIG. 2, sensor or actuator 200 is connected to time-controlled bus system 205. Sensor element 201 physically detects the particular processes or changes. Block 202 symbolizes the high-speed sensor signal processing, in the megahertz range in particular, and block 203 symbolizes the low-speed sensor signal processing, in the kilohertz range in particular. This means that the logic, i.e., the signal processing of the sensor element may be roughly divided into blocks 201 (detection), and 202 and 203 (processing). Block 204 shows the communication controller or bus interface required for connection to time-controlled bus system 205 as a bus coupling unit (204). This bus coupling unit may, as indicated by the dashed line, also be contained in sensor 200 or situated outside of sensor 200. Executive unit 208 is responsible for controlling the communication.

Sensor element 201 is driven by the sensor signal processing at a high speed, i.e., it reads and preprocesses the measurement values. This may be accomplished using either analog or digital technology. The result of this first sensor signal processing phase, i.e., high-speed processing, in the megahertz range in particular, is then processed at a lower speed, in the kilohertz range in particular, typically using digital technology. The above-mentioned output filtering is used here. In this second sensor signal processing phase, the digital sensor signal is supplied to bus coupling unit 204 after each processing pass. In particular, during the transition from the first sensor signal processing phase to the second sensor signal processing phase, i.e., between high-speed to low speed processing, the above-described phase rotation may occur.

In a first variant, the first sensor signal processing phase, i.e., high-speed processing, corresponding to block 202, is synchronized to the time of the time-controlled bus system which is external to the sensor, i.e., the cycle time or global time. This is achieved by retrieving time information representing the corresponding cycle time or global time. Such time information may be retrieved from the appropriate registers 207 or 108 of bus coupling unit 107 or 204, for example. This means that the appropriate time information for time synchronization may be retrieved from register 207 via input path 206 to prevent time uncertainties, jitter in particular. The communication path between sensor and bus coupling unit, i.e., block 203, and bus coupling unit in the case where the bus coupling unit is contained in the sensor is not to be used, but input path 206 should be configured differently to supply time information which is derived from the time behavior of the time-controlled bus system, the bus coupling unit in particular. A separate input pin may be provided for this time information which may originate from an external source, such as another control unit for example, or another bus node. This transmission to the input pin may be wire-dependent or wireless via radio signals, ultrasound, infrared, etc. Since the low-speed sensor signal processing, i.e., in the kilohertz range, also uses the bus system time which is external to the sensor, the cycle time or global time in particular, synchronization of the first and second sensor signal processing phases is guaranteed, so that the digital sensor signal is written into the bus coupling unit in a manner synchronized to the bus time.

A second variant results from the fact that the first sensor signal processing phase, i.e., high-speed processing in the megahertz range, takes place independently of the low-speed sensor signal processing in the kilohertz range. The timing of the second signal processing phase is selected to minimize the phase rotation. This second phase, however, is synchronized to the bus system time which is external to the sensor, i.e., cycle time ZT or global time GT. This is achieved either by directly reading global time GT or cycle time ZT from the time basis or as a register value. Another possibility is synchronization by processing the time information of the input path, in a special input pin in particular, which provides synchronization to the bus time of the time-controlled bus system, i.e., global time or cycle time, as a hardware signal. This results in a slight phase rotation between the first and second signal processing phases, and the digital sensor signal is written in the bus coupling unit within the second signal processing phase in a manner synchronized to the bus time.

Therefore, both of the above-mentioned variants, variant 1 and variant 2, represent synchronized output of the sensor signal to minimize time uncertainties and phase rotation relative to the time behavior of the time-controlled bus system. Thus the measurement values, i.e., data, do not need to be buffered, which would only result in displacement of the phase rotation, and not, as is now achieved by the exemplary embodiment and/or exemplary method of the present invention, in these time shifts being minimized. Buffering could also be avoided by using a DPRAM or another buffer concept, such as a removable register, such that when a new sensor value is to be written during the low-speed sensor signal processing, i.e., in the second phase, the bus coupling unit, i.e., the communication controller, transmits the sensor value in a manner synchronized to the bus time. Thus, although the sensor signal is written asynchronously to the bus time, it is transmitted synchronously in such a way that no write-read conflict occurs during access. Therefore, in this simplest, third variant, i.e., using DPRAM or another buffer concept such as a removable register, only the communication controller, i.e., bus interface 204, must be synchronized to the bus time synchronously with it by retrieving the cycle time or global time or via an input pin having edge control. To avoid greater differences or in particular to minimize them, at least the first signal processing phase may occur synchronously.

Using the exemplary embodiment and/or exemplary method of the present invention, a method and a device, a sensor or similarly an actuator, may be provided, via which the sensor or actuator is synchronized to the time-controlled bus system, so that the above-named time uncertainties and phase rotations are minimized and regulation instabilities are avoided.

What is claimed is:

1. A method for connecting at least one sensor or actuator to a time-controlled bus system, the method comprising:
   connecting the at least one sensor or actuator to perform a signal processing in at least two consecutive phases, the signal processing in a first phase being performed at a higher speed than in a second phase, wherein a result of the first phase is processed in the second phase; and
   providing that the at least one sensor or actuator is synchronized to an external time, the time being external to the sensor or actuator, of the time-controlled bus system in at least one of the phases,
   synchronizing the sensor or actuator in at least one of the phases with a time which is external to the sensor or actuator, wherein the time is at least one of a global time or a cycle time of the time controlled bus system;
   wherein synchronization occurs by at least one of:
      retrieving time information representing the time which is external to the sensor from register areas of a bus coupling unit; and
      inputting via an input path, time information being derived from the time which is external to the sensor and transmitted onto the input path,
   wherein an angular phase rotation occurs during transition from the first phase to the second phase, wherein at least one of the first signal processing phase and the second phase of the signal processing is synchronized to the external time of the time-controlled bus system, and wherein the time-controlled bus system is a time controlled bus system.

2. The method of claim 1, wherein the first signal processing phase is synchronized to the external time of the time-controlled bus system, and wherein the time-controlled bus system is one of a TTCAN system and a FlexRay system.

3. The method of claim 2, wherein synchronization occurs by retrieving time information representing the external time from register areas of a bus coupling unit.

4. The method of claim 2, wherein synchronization occurs by inputting time information via an input path, the time information being derived from the external time and transmitted on the input path.

5. The method of claim 2, wherein synchronization occurs by inputting time information via an input path, the time information being derived from the external time of a bus coupling unit and transmitted on the input path.

6. The method of claim 1, wherein the second phase of the signal processing is synchronized to the external time of the time-controlled bus system.

7. The method of claim 1, wherein the external time is a global time of the time-controlled bus system.

8. The method of claim 1, wherein the external time is a cycle time of the time-controlled bus system.

9. The method of claim 1, wherein an angular phase rotation occurs during transition from the first phase to the second phase.

10. A device for connecting at least one sensor or actuator to a time-controlled bus system, the device comprising:
   a synchronizing arrangement to synchronize the at least one sensor or actuator to an external time of the time-controlled bus system in at least one of a first phase and a second phase, wherein the at least one sensor or actuator performs a signal processing in at least two consecutive phases, the signal processing in the first phase occurring at a higher speed than in the second phase, and wherein a result of the first phase is processed in the second phase,
   wherein the signal processing in the at least one sensor or actuator is triggered externally,
   wherein the sensor or actuator synchronizes in at least one of the phases with a time which is external to the sensor or actuator, wherein the time is at least one of a global time or a cycle time of the time controlled bus system, and wherein synchronization occurs by at least one of (i) retrieving time information representing the time which is external to the sensor from register areas of a bus coupling unit, and (ii) inputting via an input path, time information being derived from the time which is external to the sensor and transmitted onto the input path, and wherein an angular phase rotation occurs during transition from the first phase to the second phase, wherein at least one of the first signal processing phase and the second phase of the signal processing is synchronized to the external time of the time-controlled bus system, and wherein the time-controlled bus system is a time-controlled bus system.

11. A sensor for connecting to a time-controlled bus system, comprising:
   a sensor arrangement to perform signal processing in at least two consecutive phases, the signal processing in a first phase occurring at a higher speed than in a second phase, wherein a result of the first phase is processed in the second phase; and
   a synchronizing arrangement to synchronize the sensor to an external time of the time-controlled bus system in at least one of the at least two phases,
   wherein the signal processing in the sensor arrangement is triggered externally,
   wherein the sensor synchronizes in at least one of the phases with a time which is external to the sensor, wherein the time is at least one of a global time or a cycle time of the time controlled bus system, and wherein synchronization occurs by at least one of:
      retrieving time information representing the time which is external to the sensor from register areas of a bus coupling unit; and
      inputting via an input path, time information being derived from the time which is external to the sensor and transmitted onto the input path, and
   wherein an annular phase rotation occurs during transition from the first phase to the second phase, wherein at least one of the first signal processing phase and the second phase of the signal processing is synchronized to the external time of the time-controlled bus system, and wherein the time-controlled bus system is a time-controlled bus system.

12. An actuator for connecting to a time-controlled bus system, comprising:
   an actuator arrangement to perform signal processing in at least two consecutive phases, the signal processing in a first phase occurring at a higher speed than in a second phase, wherein a result of the first phase is processed in the second phase; and
   a synchronizing arrangement to synchronize the actuator to an external time of the time-controlled bus system in at least one of the at least two phases, wherein the signal processing in the actuator arrangement is triggered externally,
   wherein the actuator synchronizes in at least one of the phases with a time which is external to the actuator, wherein the time is at least one of a global time or a cycle time of the time controlled bus system, and wherein synchronization occurs by at least one of:
      retrieving time information representing the time which is external to the sensor from register areas of a bus coupling unit; and
      inputting via an input path, time information being derived from the time which is external to the sensor and transmitted onto the input path, and
   wherein an angular phase rotation occurs during transition from the first phase to the second phase, wherein at least one of the first signal processing phase and the second phase of the signal processing is synchronized to the external time of the time-controlled bus system, and wherein the time-controlled bus system is a time-controlled bus system.

* * * * *